United States Patent [19]

Lousberg

[11] Patent Number: 4,658,575

[45] Date of Patent: Apr. 21, 1987

[54] METHOD OF AND APPARATUS FOR REPLACING FULL BOBBINS ON A CONTINUOUS SPINNING MACHINE

[75] Inventor: Pierre Lousberg, Stembert, Belgium

[73] Assignee: Societe Anonyme des Ateliers Houget Duesberg Bosson, Verviers, Belgium

[21] Appl. No.: 651,717

[22] Filed: Sep. 18, 1984

[30] Foreign Application Priority Data

Sep. 19, 1983 [BE] Belgium .............. 0/211.546

[51] Int. Cl.[4] .......................................... D01H 9/04
[52] U.S. Cl. ................................................. 57/274
[58] Field of Search ............ 57/274, 273, 275, 266, 57/276, 281, 267

[56] References Cited

U.S. PATENT DOCUMENTS

| | | | |
|---|---|---|---|
| 1,496,079 | 6/1924 | Alderman | 57/273 |
| 3,823,538 | 7/1974 | Igel | 57/274 |
| 4,473,997 | 10/1984 | Kawasaki et al. | 57/266 X |

FOREIGN PATENT DOCUMENTS 3137990  4/1983  Fed. Rep. of Germany ........ 57/274

Primary Examiner—Stuart S. Levy
Assistant Examiner—Joseph J. Hail, III

[57] ABSTRACT

An apparatus for replacing full bobbins on spindles of a continuous spinning machine by empty tubes situated on fixed pegs near the spindles, and arranged in a plurality of consecutive spinning positions in the spinning machine, has a gripping mechanism for simultaneously removing the full bobbins and the empty tubes of two consecutive spinning positions from the spindles and pegs respectively, and for simultaneously replacing the full bobbins and empty tubes on the pegs and spindles, respectively, of the two consecutive spinning positions. The gripping mechanism is of the quadruple mechanism type having four separate grippers, respectively for engaging the full bobbin of one spinning position; for engaging the empty tubes of the one spinning position; for engaging the full bobbin of the other spinning position, and for engaging the empty tube of the other spinning position. There is also a mechanism for moving the grippers vertically in the direction of longitudinal axes of the spindles and pegs, respectively, and one for rotating the grippers about a vertical axis by 180° in one direction about the center of a parallelogram defined by the points of intersection between a horizontal plane and the axes.

5 Claims, 35 Drawing Figures

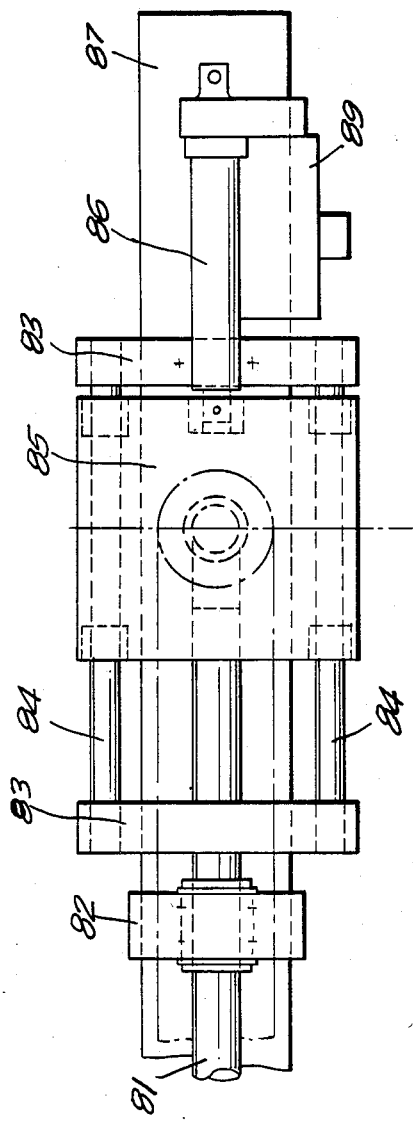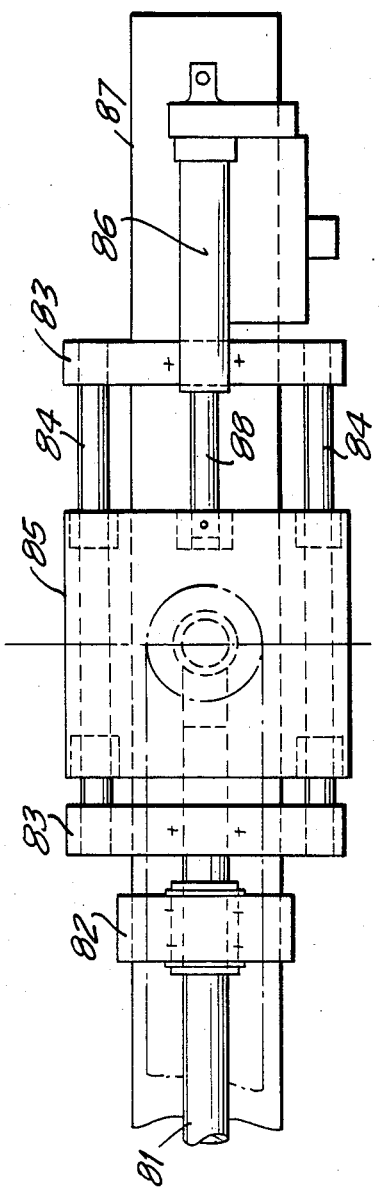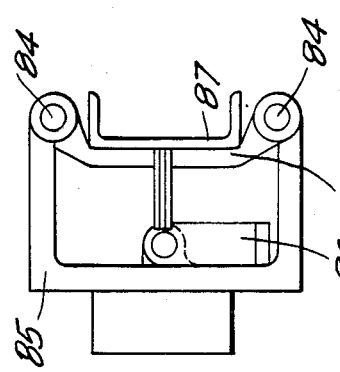

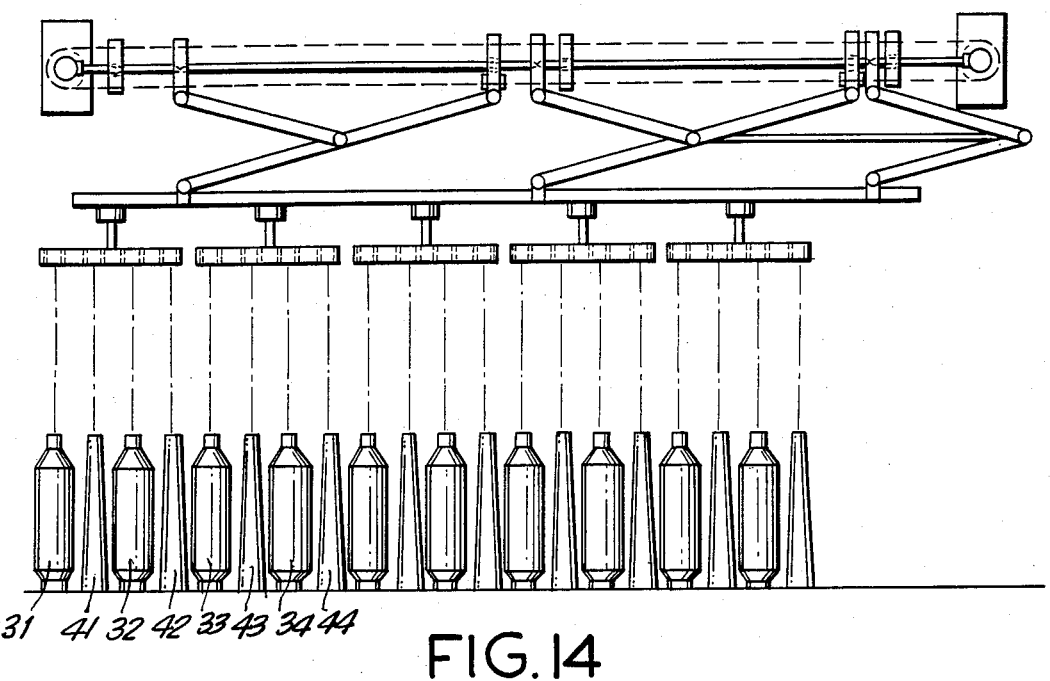
31 41 32 42 33 43 34 44  FIG.14
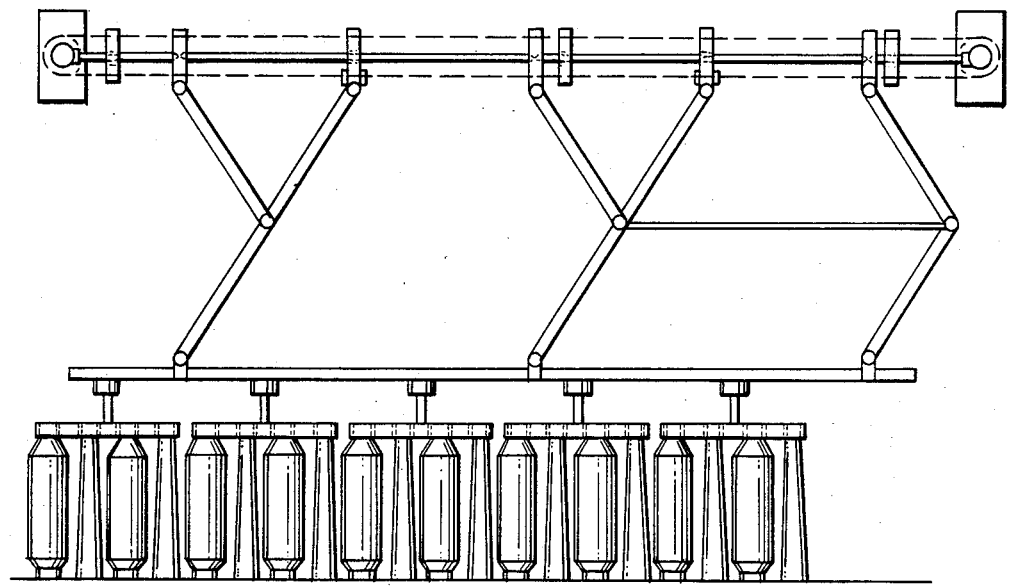
FIG.15

METHOD OF AND APPARATUS FOR REPLACING FULL BOBBINS ON A CONTINUOUS SPINNING MACHINE

BACKGROUND OF THE INVENTION

This invention relates to continuous spinning machines and concerns a method and apparatus for replacing full bobbins on the spindles of a continuous spinning machine by empty tubes disposed on fixed pegs situated near the spindles.

Any continuous spinning machine, of course, comprises the following components:

(a) A vertical rotating spindle on which a cardboard or plastic tube is disposed, the yarn being wound thereon;

(b) A ring on which a traveller slides and which moves along the tube with a reciprocating motion to distribute the yarn turns over the entire tube length.

The yarn, which originates from doffing cylinders, enters the traveller and is wound on the tube.

When the tube is sufficiently covered with yarn the resulting bobbin has to be removed from the spindle, which is now stationary, and placed on a peg provided for the purpose, or in a skip truck. A tube can then be replaced on the spindle and another bobbin restarted.

Removal of the bobbin and the fitting of the tube were originally carried out manually.

Automatic devices then appeared in order to reduce handling times and heavy and repetitive work.

The object of this invention is basically to automate replacement of full bobbins by empty tubes on a machine having a given number of spindles.

The situation when the bobbins are completed is as follows:

(a) The full bobbin is situated vertically on the spindle;

(b) An empty tube is situated vertically on the replacement tube peg, the peg itself being some distance in front of the spindle and possibly slightly offset in relation thereto, and therefore in fact between the spindle in question and the next spindle.

In practice, the problem underlying the invention is to remove the full bobbin from the spindle, remove the empty tube from the peg, and change over the full bobbin and the empty tube so that the latter is placed on the spindle and the full bobbin on the peg.

Certain factors have to be taken into account, but they will not be detailed here, since the devices used to solve those difficulties do not form part of the invention.

For Example:

(a) The full bobbin is clamped on the spindle by deformation of the cardboard or plastic tube as a result of the tension with which the yarn is wound. The bobbin therefore has to be released and it will be assumed that it has been released;

(b) The yarn originating from the doffing cylinders and wound on the bobbin must be cut to allow the full bobbin to be removed and replaced by the empty tube. It will be assumed that the yarn has been cut.

BRIEF SUMMARY OF THE INVENTION

To solve the problem, one basic feature is the provision of means whereby the full bobbin and the empty tube corresponding to a given spinning position are removed simultaneously from the spindle and peg respectively and replaced simultaneously on the peg and spindle respectively.

In practice, various considerations must be taken into account together with different embodiment features which also form part of the invention.

One such consideration is that the full bobbin situated on the spindle must be engaged and removed from the spindle by lifting it vertically sufficiently for the full bobbin to be fully released from the spindle.

Similarly, the empty tube must be engaged and lifted vertically sufficiently for the empty tube to be fully released from the peg and, also, for the bottom end of the empty tube to be higher than the top end of the spindle.

According to the invention, the full bobbin and the empty tube are engaged by mechanical or pneumatic grippers acting on the interior or exterior of the bobbin or tube. These grippers can move vertically along the axis of the spindle and peg respectively.

BRIEF DESCRIPTION OF THE DRAWINGS

The invention will be explained, by way of example, referring to the accompanying drawings, in which:

FIG. 11 shows a part of the mechansm in a first position;

FIG. 12 shows the mechanism in a second position;

FIG. 13 is a side view of FIG. 11;

FIGS. 14 to 19 show consecutive positions of another mechanism for controlling the gripper device;

DETAILED DESCRIPTION OF PREFERRED EMBODIMENTS

Figure 1:
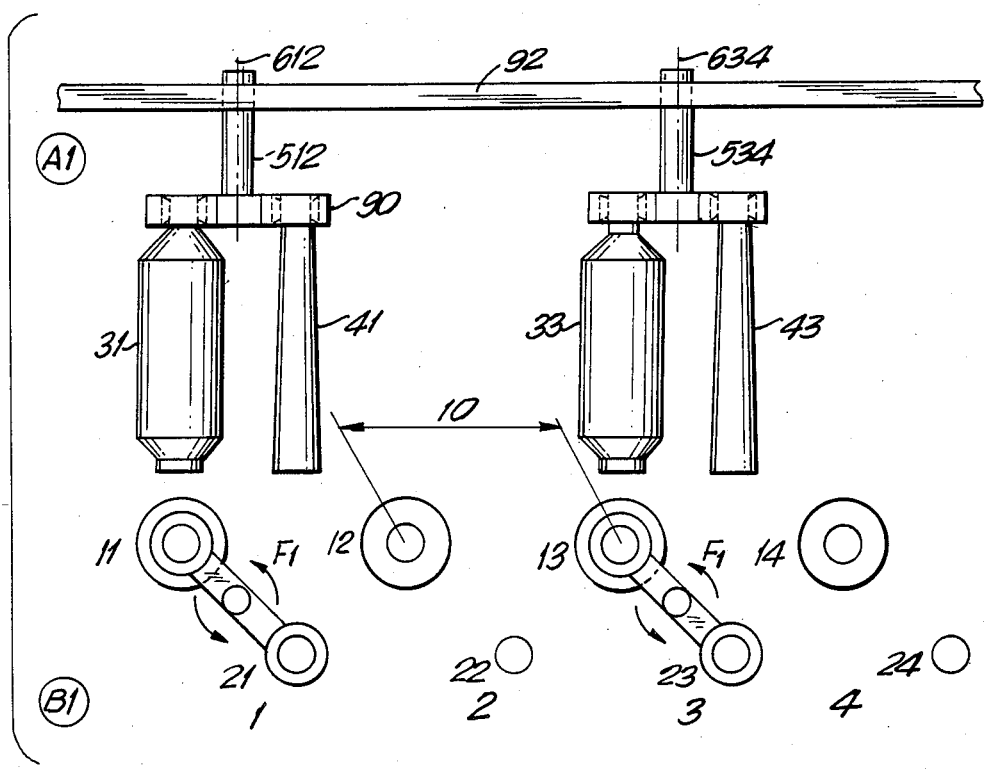
FIG. 1 shows a gripper device according to the present invention, and the spindles and pegs in a first position.
Figure 2:
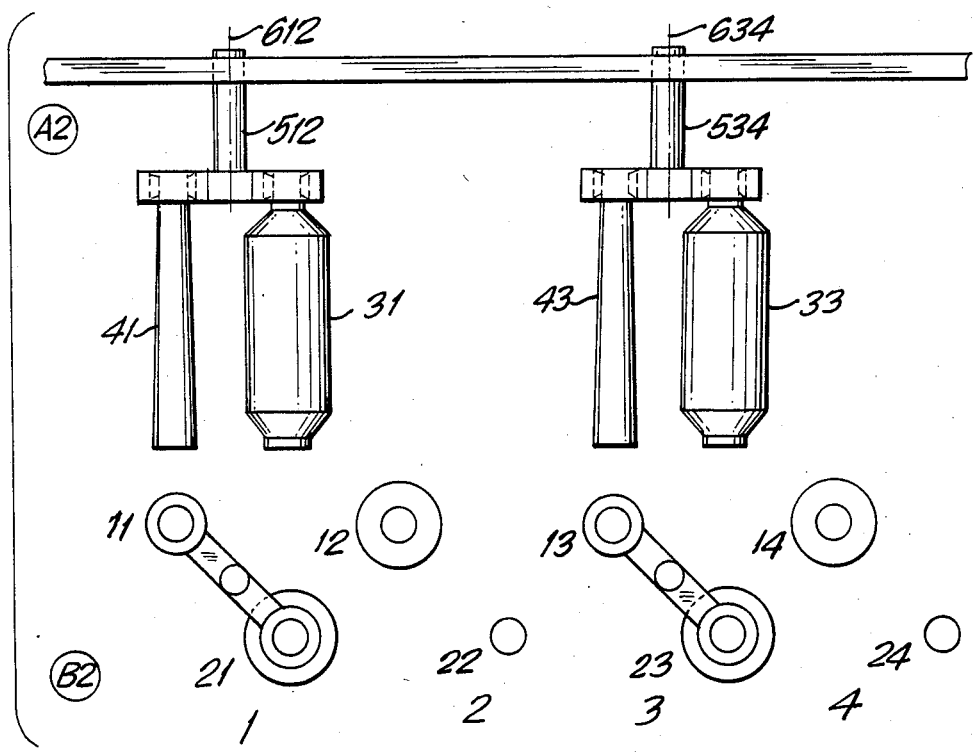
FIGS. 2 to 4 show the gripper device, spindles and pegs in three further spinning positions.

A first embodiment of the invention will be described hereinbelow to show the principles on which the invention is based, with reference to FIGS. 1-13 of the accompanying drawings wherein:

FIGS. 1-4 show the gripper device and the spindles and pegs in four consecutive spinning positions.

FIGS. 5-10 also show four spinning positions but in conjunction with the mechanism for controlling the change from one position to another.

FIGS. 11-13 relate to said mechanism.

Referring to FIGS. 1-4 of the drawings, references 1-4 denote four consecutive spinning positions:

References 11-14 denote the position of the corresponding spindles

References 21-24 denote the positions of the corresponding pegs

References 31-34 represent the corresponding full bobbins

References 41-44 represent the corresponding empty tubes

References 512-534 represent the gripper devices corresponding to the spinning positions 1, 2, 3, 4.

Reference 10 denotes the pitch.

FIGS. 1-4 each show the corresponding situation of four spinning positions in elevation A and in plan view B.

FIGS. 1-4 show the successive positions of the various components.

A1-B1: In spinning position 1, the gripper mechanism 512 has just disengaged the full bobbin 31 from the spindle 11 and the empty tube 41 from the peg 21. The situation is the same in spinning position 3. The gripper mechanisms 512 and 534 are ready to perform a 180° rotation about axes 612 and 634 in the direction of arrows $F_1$.

A2-B2: In spinning position 1, rotation has taken place and the gripper mechanism 512 can place the full bobbin 31 on the peg 21 and the empty tube 41 on the spindle 11. The situation is the same in spinning position 3.

Figure 3:
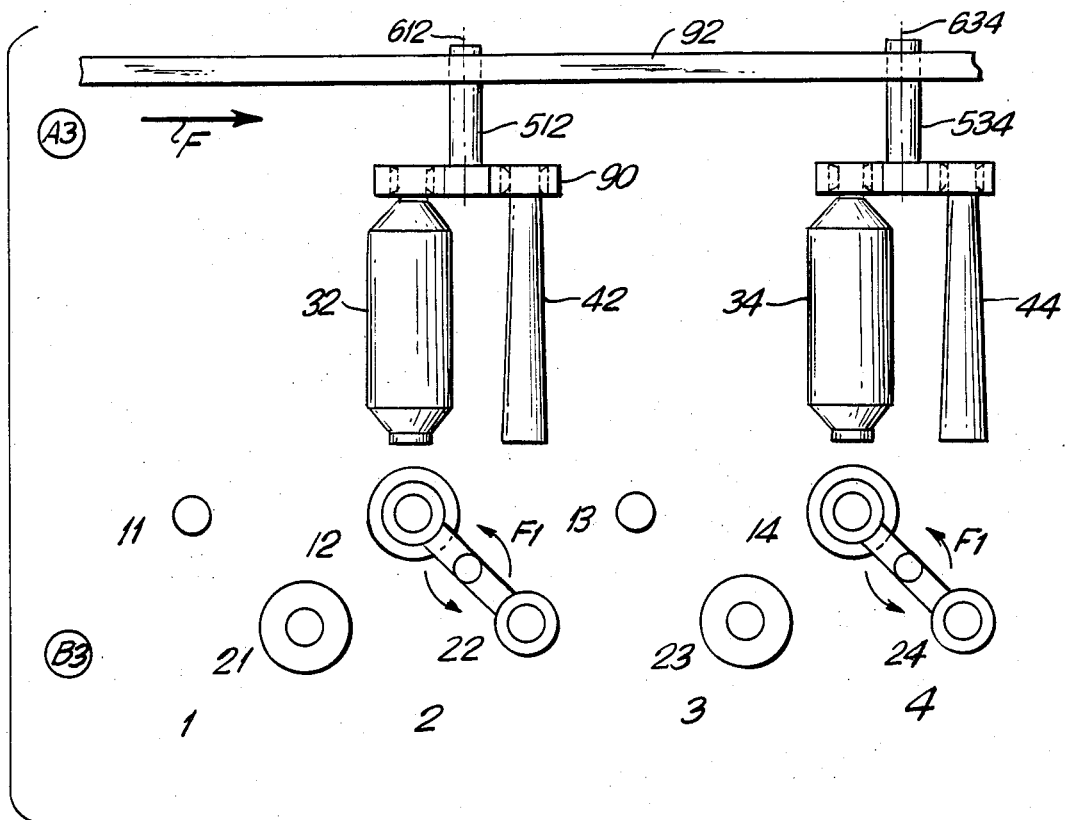
Figure 4:
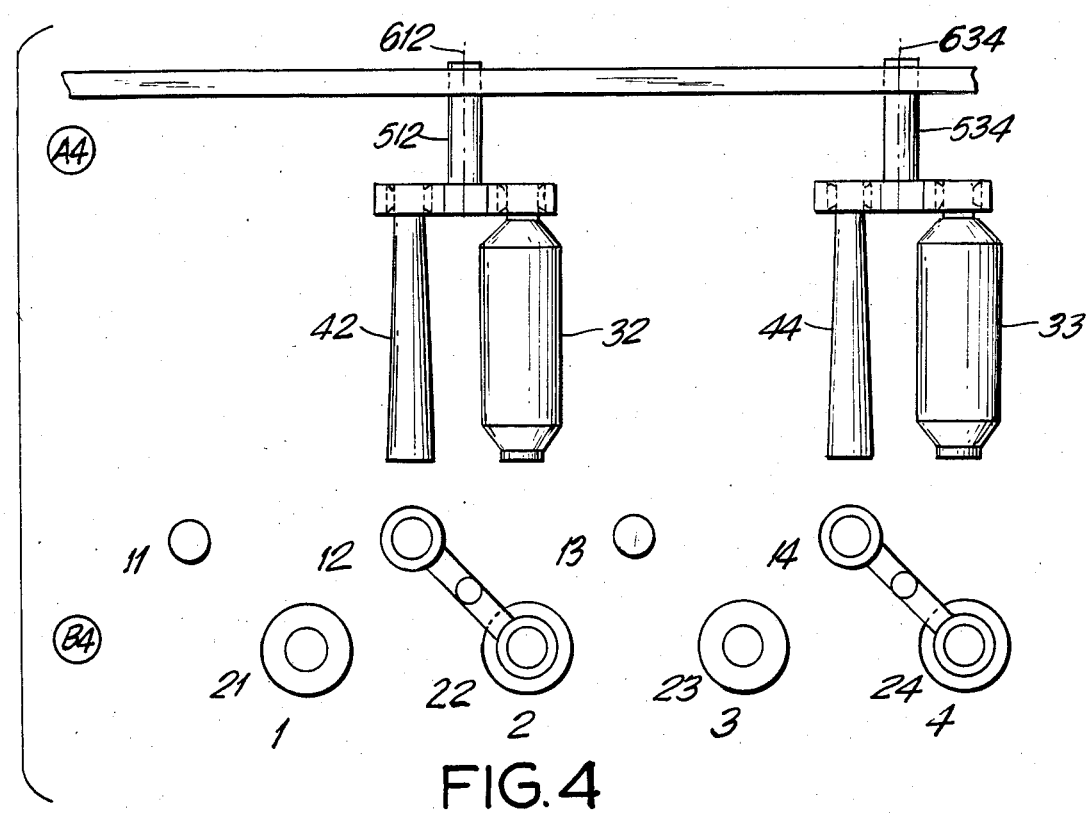

A3-B3: The full bobbin 31 has now been placed on the peg 21 and the gripper mechanisms 512 and 534 have moved by an amount equal to the pitch 10 in the direction of arrow F so that mechanism 512 is situated in spinning position 2 and mechanism 534 in spinning position 4. The gripper mechanism 512 has just disengaged the bobbin 32 from the spindle 12 and the empty tube 42 from the peg 22. The situation is the same in spinning position 4. The gripper mechanisms 512 and 534 are ready to perform a 180° rotation about axes 612 and 634 in the direction of arrows $F_1$ (FIG. 3).

A4-B4: In spinning position 2, rotation has taken place and the gripper mechanism 512 can place the bobbin 32 on the peg 22 and the empty tube 42 on the spindle 12. The situation is the same in spinning position 4. After the bobbin 32 has been placed on the peg 22 and the empty tube 42 on spindle 12 the mechanisms 512 and 534 will return to spinning positions 1 and 3 to prepare for the next bobbin removal.

The gripper mechanism comprises a horizontal shaft 81 supporting the complete mechanism (FIGS. 5-11).

Shaft 81 can move longitudinally in bearings 82 secured to a fixed bracket 87. It is connected to a carriage 85 which can slide in guides 84 which are in turn secured to the bracket 87 by supports 83. An electrical actuator 86 or some other device has the moving rod 88 secured to the carriage 85 and the stationary part 89 connected to the bracket 87.

Depending upon whether the actuator 86 is or is not energised, the carriage 85 will move in either direction on the guides 84 and as it does so will drive the shaft 81 and the complete gripper mechanism.

The grippers 90 are secured by rods 91 to a horizontal bar 92.

Figure 5:
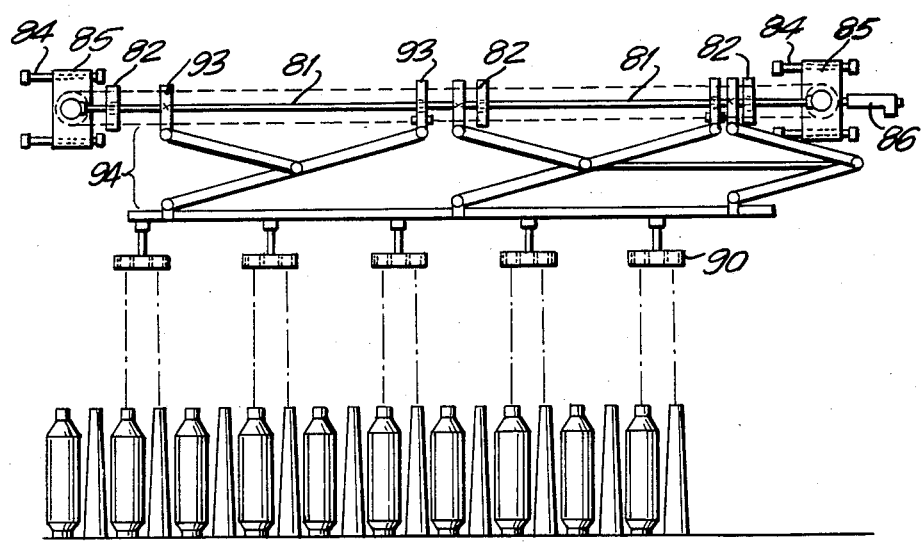
FIG. 5 shows the mechanism for controlling the gripper device, in a first position.

Plates 93 are secured on the shaft 81 and act as supports for a linkage system 94 connected to the bar 92 and formed by elements adapted to allow the system to operate as described below:

Referring to FIGS. 5-10:

FIG. 5: Starting position.

Figure 6:
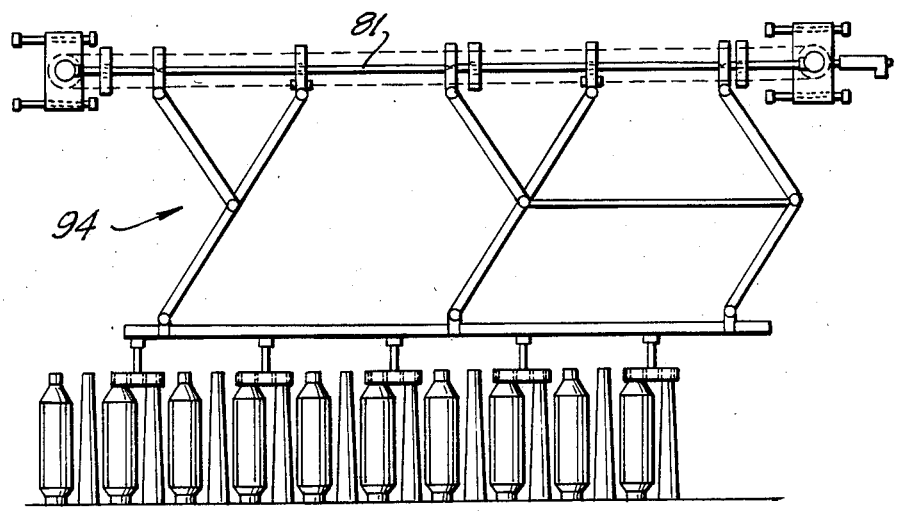
FIGS. 6 to 10 show the mechanism in further consecutive positions.

FIG. 6: The gripper mechanism is lowered on to the full bobbins and empty tubes of odd number (counting from the right)

Figure 7:
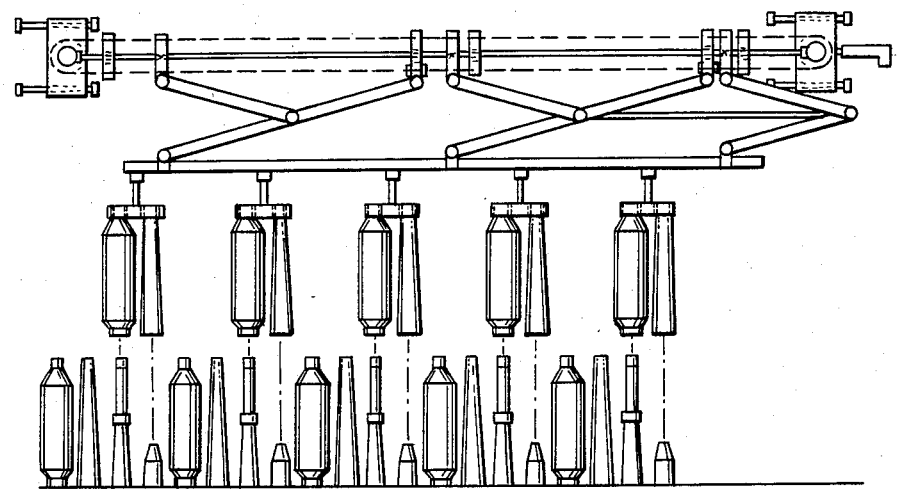

FIG. 7: The gripper mechanism lifts these full bobbins and empty tubes.

Figure 8:
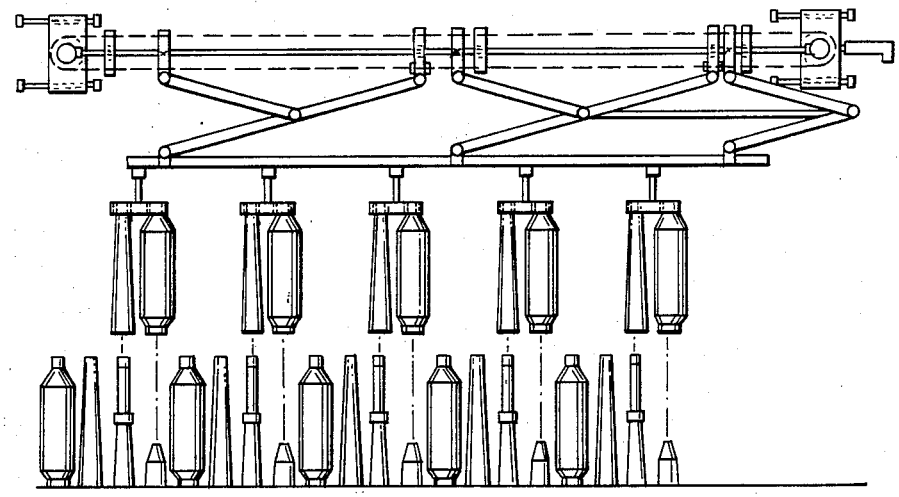

FIG. 8: Rotation has taken place.

Figure 9:
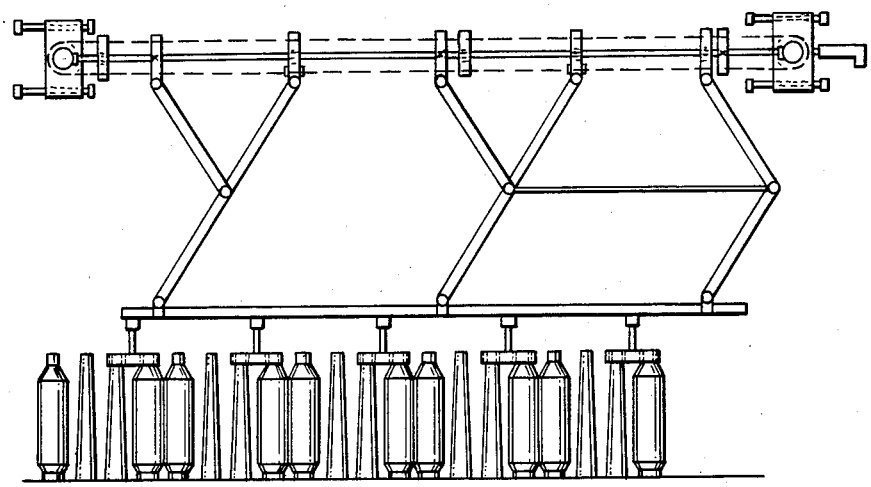

FIG. 9: The gripper mechanism re-lowers the full bobbins and empty tubes which have been respectively changed over.

Figure 10:
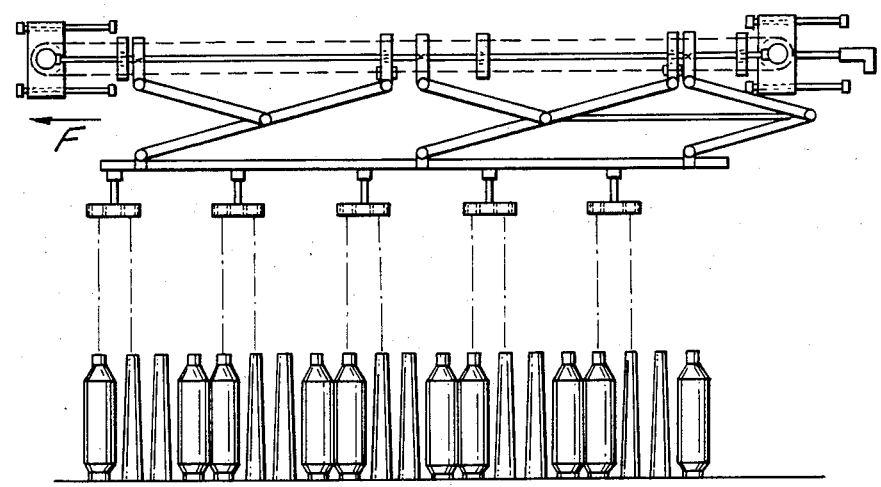

FIG. 10: The gripper mechanism has been raised, has shifted to the left by the pitch 10 and is ready to carry out the same operation on the even-numbered positions. The grippers can be any known gripper system.

As already stated hereinbefore, the above embodiment is a basic embodiment.

The most advantageous application of the invention, however, is to a preferred embodiment in which means are provided whereby the full bobbins and the empty tubes of two consecutive spinning positions are simultaneously removed from the spindles and pegs respectively and simultaneously replaced on the pegs and spindles respectively.

In an embodiment of this kind, a gripper mechanism is provided for each group of two spinning positions (an odd-numbered position and the next even-numbered position). A gripper mechanism of this kind therefore comprises four separate grippers, the first to engage the full bobbin of the odd-numbered spinning position, the second to take the empty tube from the odd-numbered spinning position, the third to take the full bobbin from the even-numbered spinning position and the fourth to take the empty tube from the even-numbered spinning position.

A mechanism of this kind will hereinafter be termed a "quadruple mechanism".

When the quadruple mechanism has raised the two full bobbins and the two empty tubes sufficiently, as described hereinbefore, the four grippers are simultaneously rotated about a vertical axis passing through the centre of the parallelogram defined by the points of intersection of a horizontal plane and the axes of the two spindles and of the two pegs with which the quadruple mechanism is associated.

After the four grippers and hence the bobbins and tubes that they have respectively engaged have been rotated through 180°, the two full bobbins are situated at the place where the two empty tubes were situated before the rotation, and vice-versa.

If the quadruple mechanism is then moved vertically downwards with the exactly opposite movement to that which it carried out to remove the bobbins from the spindles and the tubes from the pegs, the full bobbins are then placed on the pegs and the empty tubes on the spindles.

This concludes the change-over of bobbins and tubes.

It should be noted that the above movements cause the full bobbin of the odd-numbered spinning position to be placed on the peg of the even-numbered spinning position, and vice-versa; similarly, the empty tube of the odd-numbered spinning position is placed on the spindle of the even-numbered spinning position, and vice-versa. This supplementary inversion has no adverse effect since all the spinning positions are identical.

Nevertheless, another difficulty must be taken into account.

Any continuous spinning machine comprises a number of parallel vertical spindles aligned along a horizontal straight line which defines the longitudinal axis of the machine. Each spindle is separated from the next spindle and the previous spindle by a fixed distance. The distance between the vertical axes of two consecutive spindles is the spinning machine spindle gauge or pitch. This pitch is kept as small as possible to reduce the overall size of the machine, but it must nevertheless be greater than the maximum diameter of the full bobbin. Hereinafter the term "spindle" will denote the mechanical component and the words "spinning position" will define the physical location of the spindle.

The continuous spinning machine pitch is not large enough for the two bobbins and the two tubes—during the 180° rotation described hereinabove—always to lie, during their movement, inside a distance equal to twice the pitch, as considered along the longitudinal axis of the machine.

During their simultaneous rotation, the full bobbin of the odd-numbered spinning position of a quadruple mechanism must not collide with the empty tube of the even-numbered spinning position of the previous quadruple mechanism and the empty tube of the even-numbered spinning position of the quadruple mechanism must not collide with the full bobbin of the odd-numbered spinning position of the next quadruple mechanism and to achieve this essential effect, according to the invention, an offset must be produced between the rotation of the quadruple mechanism and that of the previous and subsequent quadruple mechanisms.

To this end, one drive is provided for rotation of the odd-numbered quadruple mechanisms and a separate drive for the rotation of the even-numbered quadruple mechanisms. These drives are so arranged that:

(a) The direction of rotation of the even-numbered quadruple mechanisms is the reverse to that of the odd-numbered quadruple mechanisms, (b) Rotation of the odd-numbered quadruple mechanisms is effected with some delay in relation to the rotation of the even-numbered mechanisms, this delay hereinafter being referred to as "phase-shift".

The combined effect of these two means gives a "gearing" effect between the full bobbins and the empty tubes of two consecutive quadruple mechanisms, so that the interpenetration of the movements takes place without any collision between the bobbins and the tubes of the adjacent mechanisms. The value of the phase-shift must, of course, be controlled in dependence on the pitch and the diameters of the tube and bobbin.

When the full bobbins have been placed on the pegs and the empty tubes on the spindles, the quadruple mechanisms undergo a new 180° idle rotation to resume their initial positions and be ready for the next operation.

One example of a practical embodiment of this advantageous aspect will be described with reference to the accompanying drawings (FIG. 14), wherein:

FIGS. 14–19 show the operation of the system in elevation.

FIGS. 20–24 show the rotation of the quadruple mechanisms in elevation and plan view.

Figure 25:
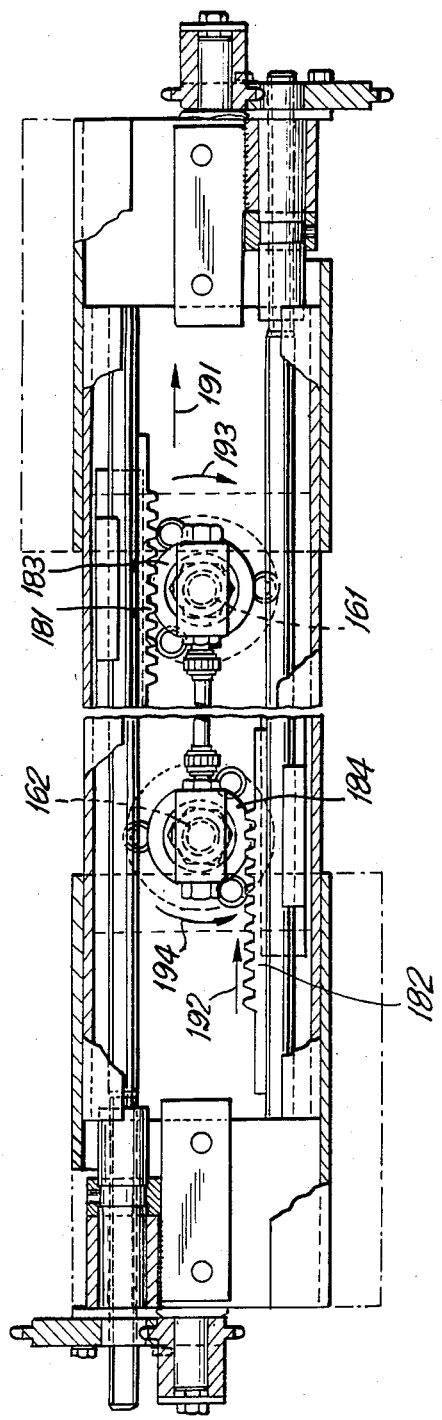
FIG. 25 shows a system for rotating the quadruple mechanism.

FIG. 25 shows the system providing rotation of the quadruple mechanisms.

FIGS. 26–29 show the means providing the phase-shift between the movement of even-numbered racks and odd-numbered racks.

Figure 30:
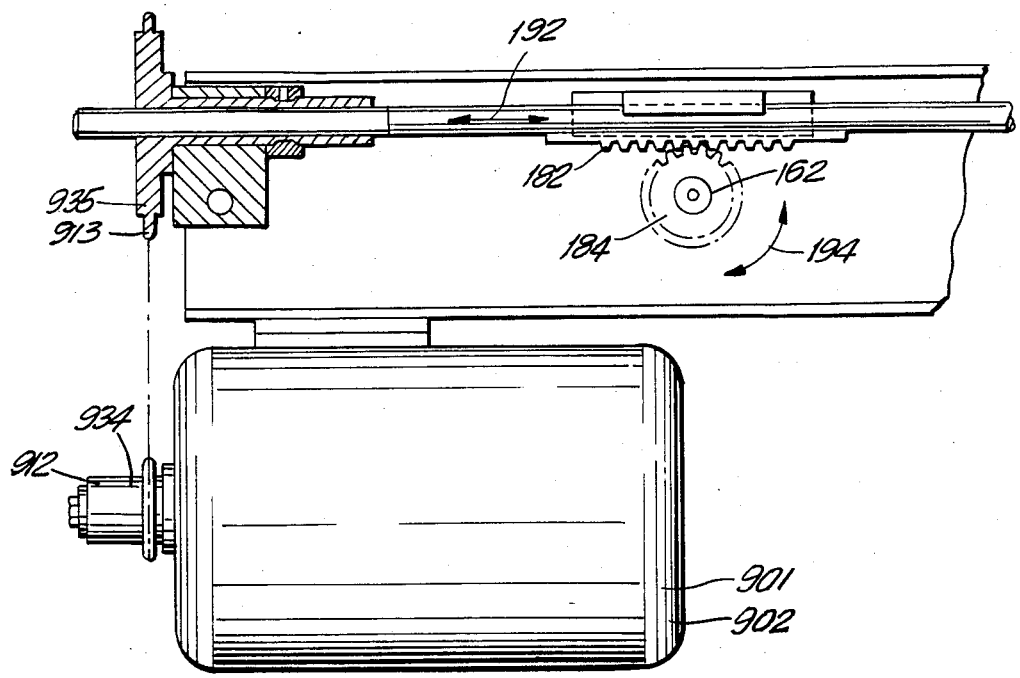
FIG. 30 shows means for moving the racks.

FIG. 30 is an exemplified embodiment of means for moving the racks.

FIGS. 14 to 19 are elevations of a system made up of 10 spinning positions:

11–14 denote the corresponding spindles
22–24 denote the corresponding pegs
31–34 represent the corresponding full bobbins
41–44 represent the corresponding empty tubes
512–513 represent the quadruple mechanisms corresponding to the first two spinning positions, on the one hand, and the next two, on the other hand.

Referring to FIG. 14, the quadruple mechanisms are situated above the full bobbins and empty tubes.

Referring to FIG. 15, the quadruple mechanisms have lowered to the level of the bobbins and tubes: the four grippers of the quadruple mechanism 512 respectively engage the bobbins 31 and 32 and the empty tubes 41 and 42.

Figure 16:
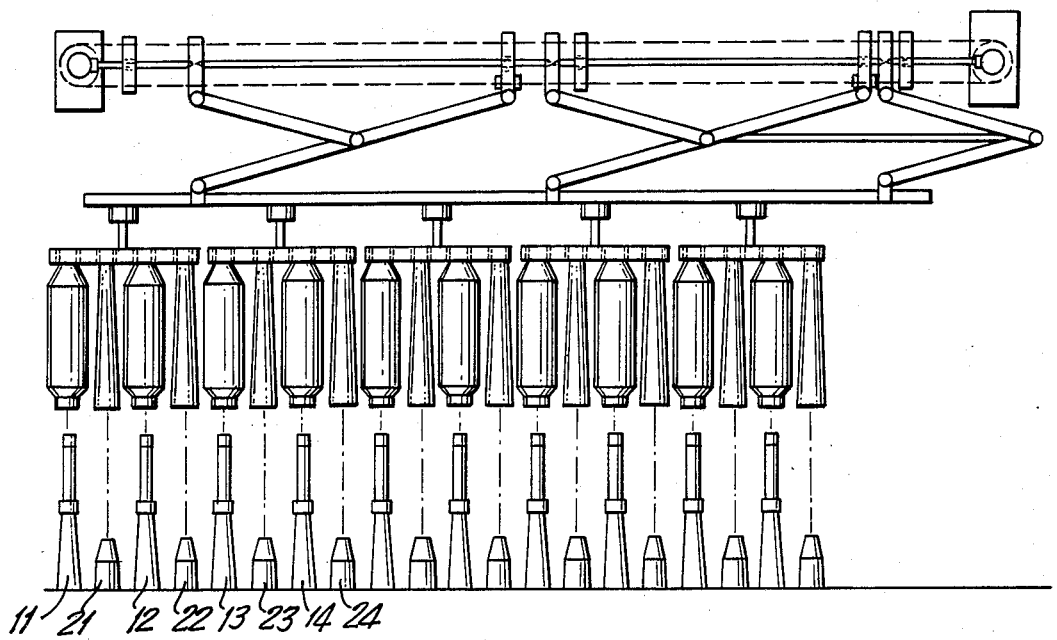

In FIG. 16 the quadruple mechanisms have lifted to the top position; the full bobbins 31 and 32 have been removed from their spindles 11 and 12 and the empty tubes 41 and 42 have been removed from their pegs 21 and 22.

Figure 17:
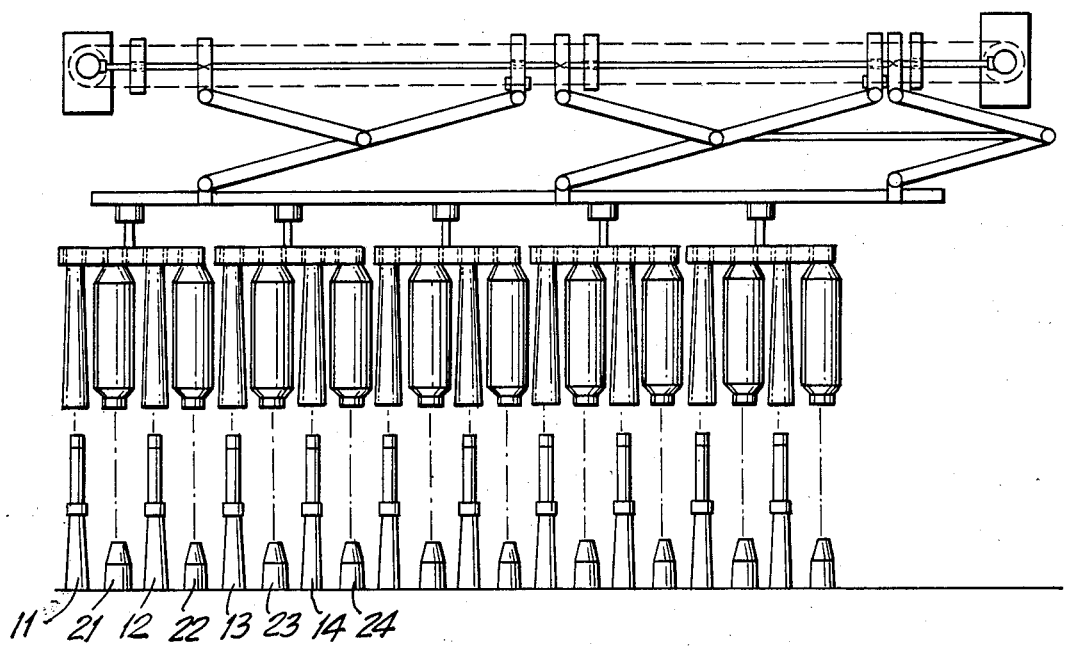

Referring to FIG. 17, the quadruple mechanisms have turned 180° around their axis. For example, mechanism 512 has rotated about its axis 612.

Figure 18:
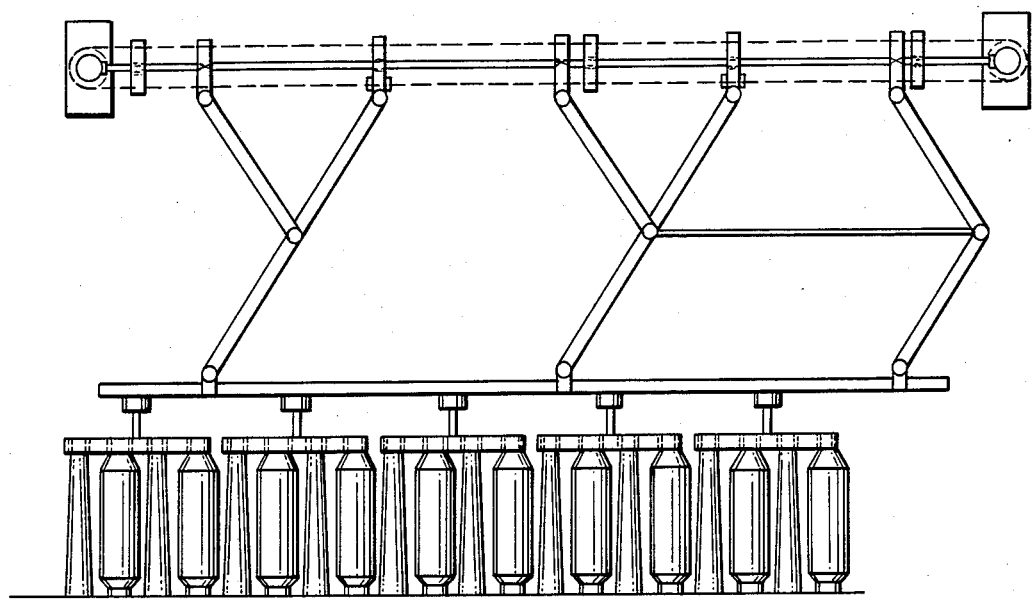

In FIG. 18 the quadruple mechanisms have re-lowered to the level of the spindles and pegs, the full bobbins have been placed on the pegs and the empty tubes on the spindles.

Figure 19:
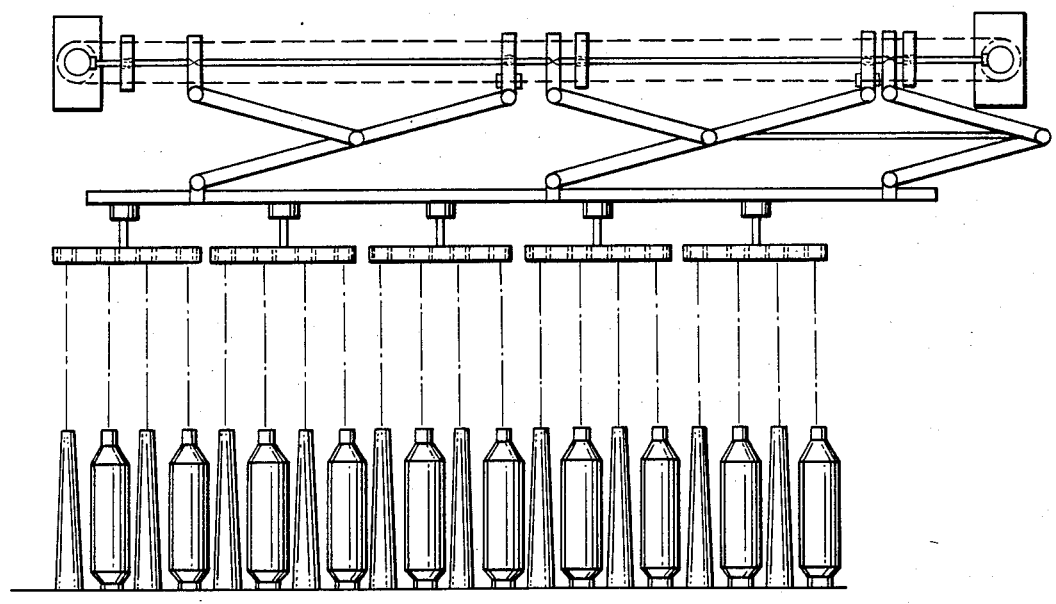

In FIG. 19 the quadruple mechanisms have lited to the top position and, after a 180° rotation in the opposite direction, are ready for the next operation.

FIGS. 20 to 24 illustrate the rotation which takes place between FIGS. 17 and 18; the drawings A are elevations and B are plan views.

Figure 20A:
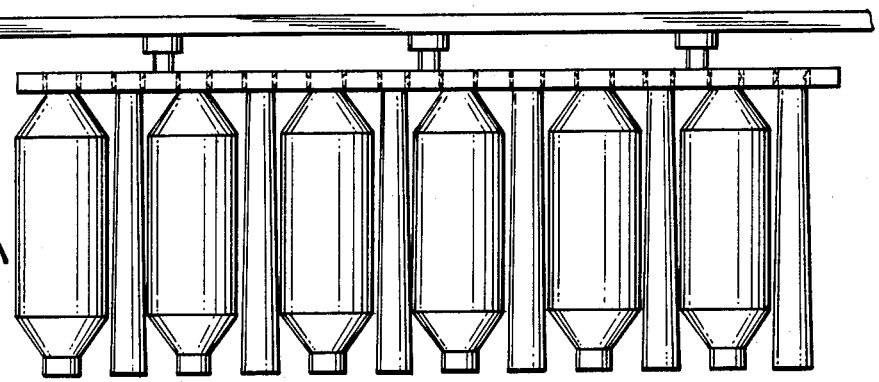
FIGS. 20A to 24B show different consecutive positions of a quadruple gripper mechanism according to the invention.

In FIG. 20, the quadruple mechanisms 512 and 534 have engaged the bobbins 31–34 and the tubes 41–44.

Figure 21A:
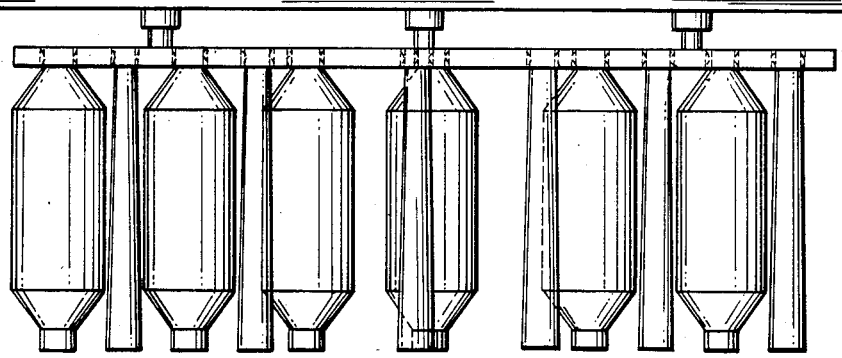
Figure 21B:
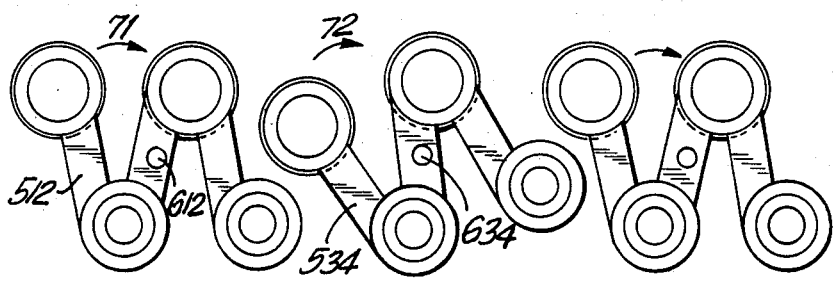

In FIG. 21, the even-numbered quadruple mechanisms, including mechanism 534, have started to rotate in the direction of the arrow 72, the odd-numbered mechanisms still being motionless.

Figure 22A:
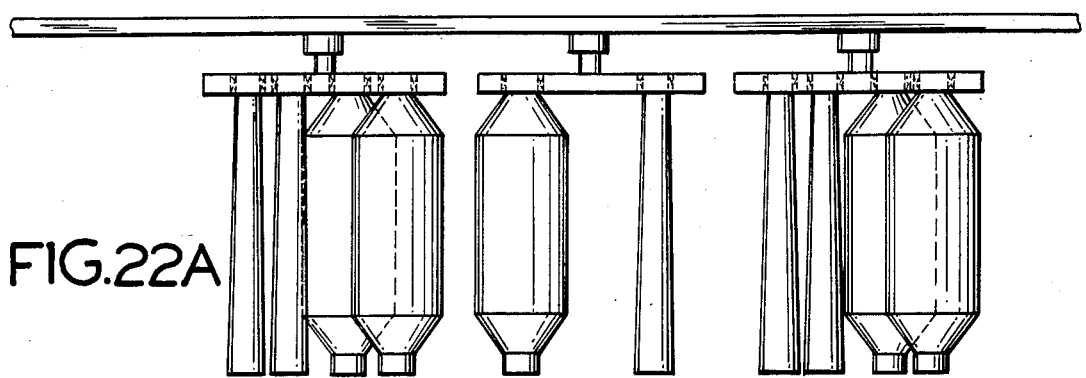
Figure 22B:
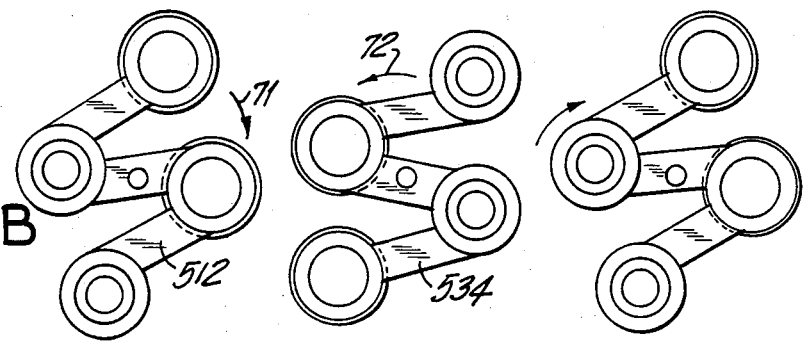

In FIG. 22, the even-numbered mechanisms continue their rotation in the direction of arrow 72 while the odd-numbered mechanisms have started a rotation in the opposite direction as shown by arrow 71.

Figure 23A:
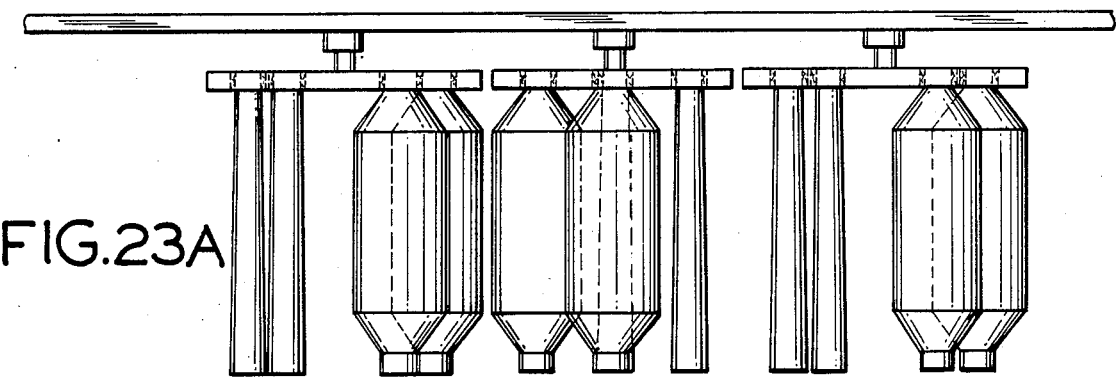
Figure 23B:
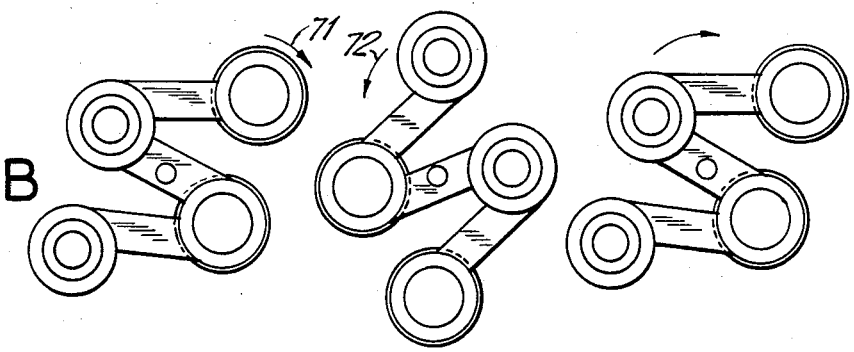

In FIG. 23 the above-described movements continue.

Figure 24A:
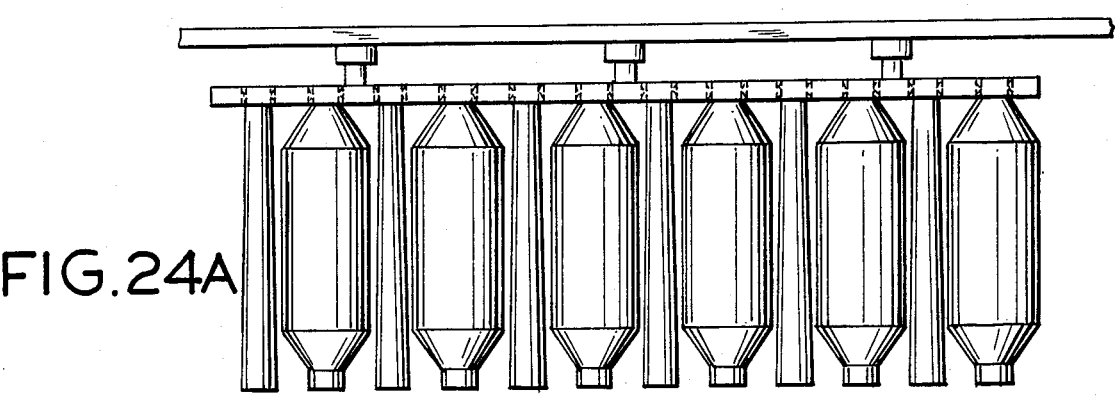
Figure 24B:
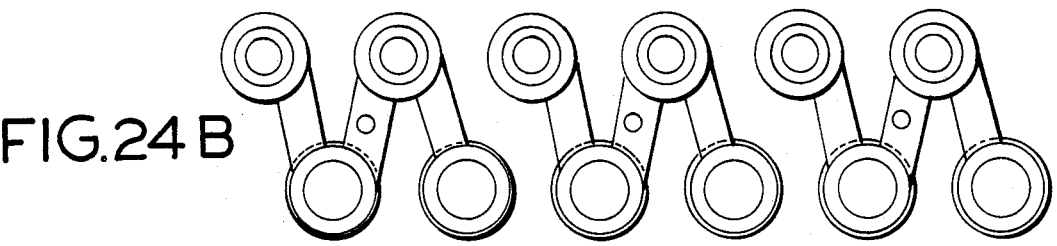

In FIG. 24 the rotations have ended, rotation of the odd-numbered mechanisms being completed before that of the even-numbered mechanisms. The full bobbins have replaced the empty tubes, and vice-versa. The bobbin 31 has taken the place of the empty tube 42 and vice-versa; the bobbin 32 has taken the place of tube 41, and vice-versa, and so on.

It will be apparent that the combination of reversal of the directions of rotation and of the phase-shift of the rotations have the effect that the full bobbins and the empty tubes of two adjacent quadruple mechanisms never come into contact.

Figure 20B:
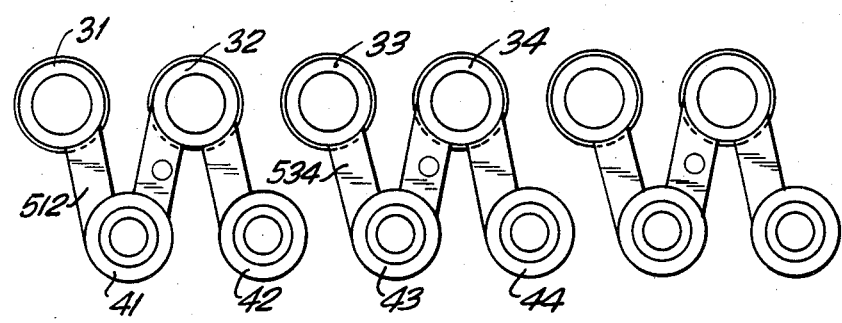

Without the combination of these two characteristics of the system, collisions between the bobbins and tubes would be inevitable. Referring to FIG. 20B, it will be very clear that if the quadruple mechanisms 512 and 534 were to rotate in the same direction and without a phase-shift the bobbin 33 and the tube 42 would come directly into contact.

FIG. 25 shows the system whereby rotation of the quadruple mechanisms is obtained. For each even-numbered quadruple mechanism a rack, e.g. 182, is moved by means (not shown) in the direction of the arrow 192 and engages with a pinion, e.g. 184, connected to the shaft 162 of the quadruple mechanism, so as to rotate the mechanism in the direction of the arrow 194. For each odd-numbered quadruple mechanism a rack, e.g. 181, is moved by means (not shown) in the direction of arrow 191 and engages with a pinion, e.g. 183, connected to the shaft 161 of the quadruple mechanism, so as to turn the mechanism in the direction of arrow 193.

The means for moving the even-numbered racks and odd-numbered racks are so arranged that the odd-numbered racks move with some delay in relation to the even-numbered racks so as to provide the above-explained phase-shift in the rotation.

Figure 26:
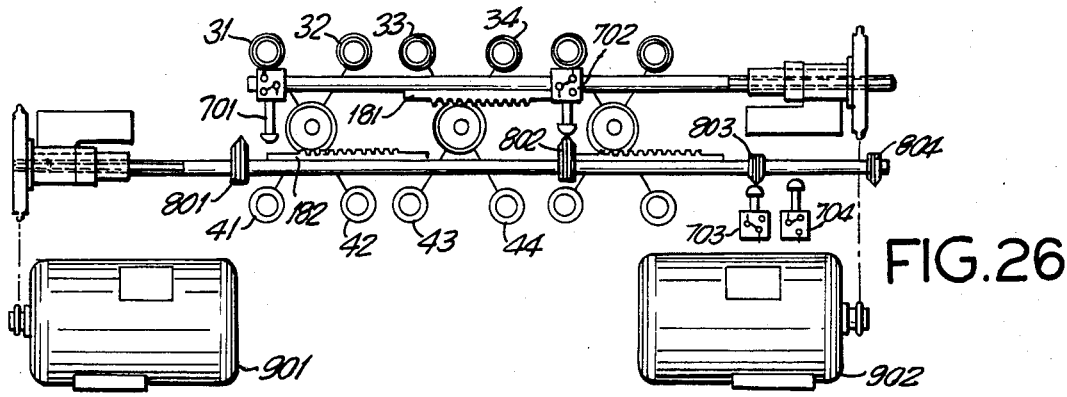
FIGS. 26 to 29 show means for phase-shifting racks, in consecutive positions.

FIG. 26 shows the quadruple mechanisms in the position for engaging the tubes and bobbins. This Figure shows the end-of-travel systems (hereinafter referred to as "switches") and sensors used:

(a) Switches 701–702 disposed on the bar bearing the rack 81

(b) Switches 703–704 disposed on a stationary part.

(c) Sensors 801–804 disposed on the bar bearing the rack 82.

The rack bars are moved through the agency of motors 901 and 902 as explained in FIG. 30.

At the start, the even and odd-numbered quadruple mechanisms are in a position such that the switch 702 monitoring the location of the even-numbered quadruple mechanisms and the switch 703 monitoring the location of the odd-numbered quadruple mechanisms are respectively on the sensors 802 and 803.

Figure 27:
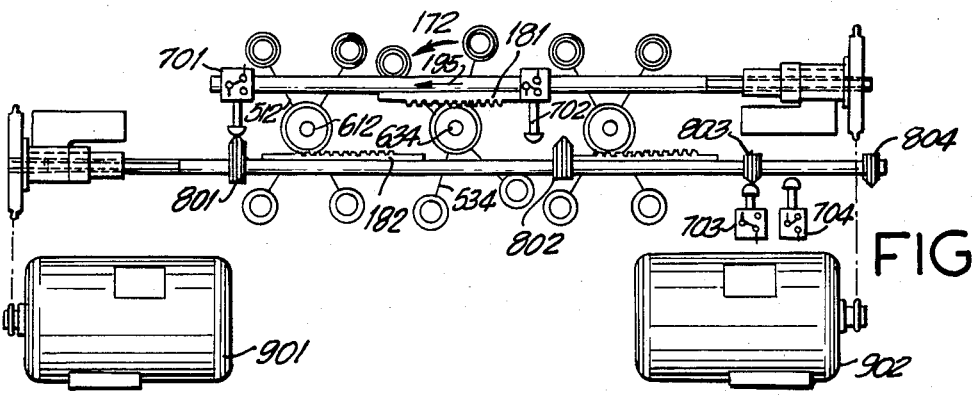

FIG. 27 shows that the motor 902 starts first and moves rack 181 in the direction of arrow 195 so that shaft 634 rotates in the direction of arrow 172 through a fraction of a revolution until switch 701 contacts sensor 801, which then stops the motor 902. The quadruple mechanism 534 has then assumed a phase-shift in relation to quadruple mechanism 512, equivalent to said fraction of a revolution.

Motor 901 then starts and advances the rack 182 in the direction of arrow 196 so that shaft 612 rotates in the direction of arrow 171 until sensor 804 comes into contact with switch 704. Switch 703 and sensor 803 are no longer in contact.

Switch 701 is then released and motor re-starts until this switch comes into contact with sensor 801 again.

The amount of rotation between the contact made by switch 703 with sensor 803 and the contact made by switch 704 with sensor 804 is 180°.

Figure 28:
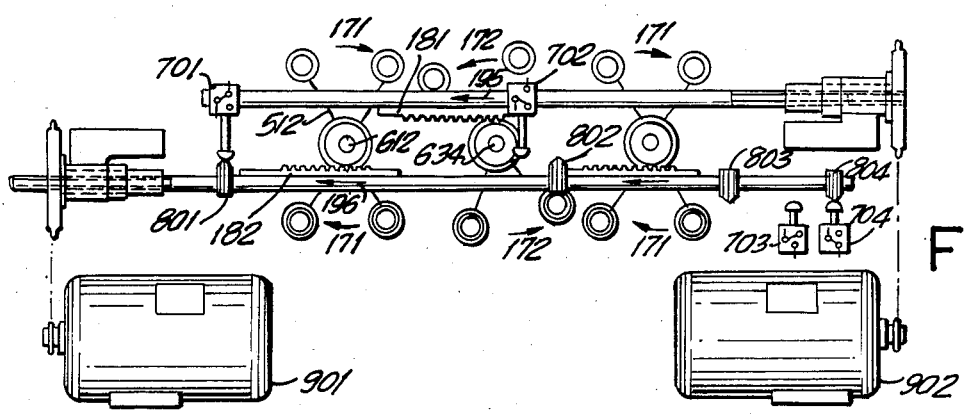

FIG. 28 shows that when switch 704 has come into contact with sensor 804 and switch 701 has come into contact with sensor 801, the shafts 634 of the even-numbered quadruple mechanisms 534 have rotated 180°, plus the value of the phase-shift, while the shafts 612 of the odd-numbered quadruple mechanisms 512 have rotated only 180°.

Figure 29:
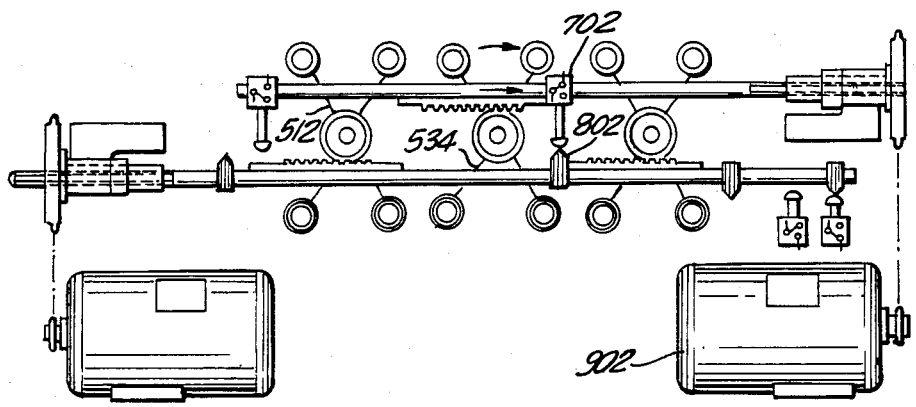

FIG. 29 shows that the motor 902 then re-starts in the opposite direction to cancel out the phase-shift, until switch 702 comes into contact with sensor 802. At that time all the systems have turned 180° and the bobbins and tubes are released by the quadruple mechanisms.

The return of the quadruple mechanisms to the initial position is carried out by opposite operations to those described above.

FIG. 30 shows the means for advancing or withdrawing the bars bearing the racks 181 and 182.

Motors 901 and 902 rotate in either the clockwise or anticlockwise direction, and ratchets 912 and 934 control the ratchets 913 and 935. They have a tapped bore which receives the bars bearing the racks 181 and 182, the bar end also being screwthreaded.

Ratchets 913 and 935 being axially locked, the bars bearing the racks 181 and 182 are moved axially in either direction (arrow 192) depending on the screwthread pitch.

I claim:

1. An apparatus for replacing full bobbins on spindles of a continuous spinning machine by empty tubes situated on fixed pegs near the spindles, said full bobbins and empty tubes being arranged in a plurality of consecutive spinning positions in said spinning machine, with a predetermined pitch, said apparatus comprising: gripping means for simultaneously removing the full bobbins and the empty tubes of two consecutive spinning positions from the spindles and pegs respectively, and for simultaneously replacing the full bobbins and empty tubes on the pegs and spindles, respectively, of said two consecutive spinning positions, said gripping means being a gripping mechanism of the quadruple mechanism type comprising four separate grippers: a first gripper for engaging the full bobbin of one spinning position; a second gripper for engaging the empty tubes of said one spinning position; a third gripper for engaging the full bobbin of the other spinning position, and a fourth gripper for engaging the empty tube of the other spinning position, means for moving said grippers vertically in the direction of longitudinal axes of the spindles and pegs, respectively, and means for rotating said grippers about a vertical axis by 180° in one direction about the center of a parallelogram defined by the points of intersection between a horizontal plane and said axes.

2. An apparatus according to claim 1, comprising means for reversing the 180° rotation of said rotating means so as to obviate collisions between bobbins and tubes.

3. An apparatus according to claim 2, wherein said means for removing the full bobbins and empty tubes of said other spinning position is rotatable by 180° with a certain angular phase-shift in relation to said means for removing said full bobbins and empty tubes of said one spinning position, to obviate any collision between bobbins and tubes.

4. An apparatus according to claim 1, comprising a rack for translating said third and fourth grippers in one direction and a pinion engaged by said rack and bodily connected to the axis of rotation of said quadruple mechanism; and another rack for translating said first and second grippers in an inverted direction, another pinion engaged by said other rack and fixed on the axis of the quadruple mechanism.

5. An apparatus according to claim 4, wherein said means for moving said one rack and said other rack comprises means for moving said other rack with some delay in relation to said one rack so as to provide a phase-shift in rotation.

* * * * *